United States Patent [19]

Konno et al.

[11] Patent Number: 5,292,829
[45] Date of Patent: Mar. 8, 1994

[54] ISOCYANURATE RING-CONTAINING CROSSLINKED POLYURETHANE POLYUREA PARTICULATE POLYMER AND PROCESS FOR PRODUCING THE SAME

[75] Inventors: Hidetoshi Konno; Yoichi Tanimoto; Ichiro Muramatsu; Mitsuo Kase; Noboru Okoshi, all of Chiba, Japan

[73] Assignee: Dainippon Ink and Chemicals, Inc., Tokyo, Japan

[21] Appl. No.: 838,898

[22] Filed: Feb. 21, 1992

[30] Foreign Application Priority Data

Feb. 22, 1991 [JP] Japan ................... 3-028572
Feb. 17, 1992 [JP] Japan ................... 4-029367
Feb. 18, 1992 [JP] Japan ................... 4-030660

[51] Int. Cl.$^5$ .................... C08G 18/79; C08L 75/02
[52] U.S. Cl. ............................ 524/591; 524/839; 428/402; 528/60; 528/61; 528/73; 528/902; 525/453; 525/902
[58] Field of Search .............. 428/402; 524/591, 839; 525/459, 453, 902; 528/73, 60, 61, 902

[56] References Cited

U.S. PATENT DOCUMENTS

| | | | |
|---|---|---|---|
| 3,655,627 | 4/1972 | Hutzler et al. | 524/839 |
| 4,016,123 | 4/1977 | Matsuda et al. | 524/839 |
| 4,203,883 | 5/1980 | Hangauer, Jr. | 524/591 |
| 4,359,541 | 11/1982 | Patton, Jr. et al. | 528/73 |
| 4,379,905 | 4/1983 | Stemmler et al. | 528/73 |
| 4,386,167 | 5/1983 | Patton, Jr. et al. | 528/73 |
| 4,431,763 | 2/1984 | Reed | 524/591 |
| 4,452,834 | 6/1984 | Nachtkamp et al. | 524/591 |
| 4,514,526 | 4/1985 | Marx et al. | 521/166 |
| 4,745,151 | 5/1988 | Noll et al. | 524/591 |
| 4,940,737 | 7/1990 | Braatz et al. | 524/591 |
| 5,075,370 | 12/1991 | Kubitza et al. | 524/591 |

Primary Examiner—John Kight, III
Assistant Examiner—Rabon Sergent
Attorney, Agent, or Firm—Armstrong, Westerman, Hattori, McLeland & Naughton

[57] ABSTRACT

A crosslinked polyurethane polyurea spherically particulate polymer having an average particle diameter of 0.1 to 500 μm, wherein the polymer molecule contains an isocyanurate ring in an amount of 10 to 30% by weight is disclosed. A process for producing the crosslinked polyurethane polyurea spherically particulate polymer is also disclosed. The process comprises the steps of: reacting an isocyanurate ring-containing polyisocyanate compound with a polyhydroxy compound to form an organic phase capable of forming a three-dimensional crosslinked structure due to the reaction, wherein the amount of isocyanate groups in the polyisocyanate compound is stoichiometrically larger than that of hydroxyl groups in the polyhydroxy compound; finely dispersing the organic phase into water; and adding a polyamine to the dispersion to make interfacial polymerization between the organic phase and the polyamine and a polyurethane-forming reaction within particles, wherein the amount of the polyamine is stoichiometrically equivalent to or smaller than the stoichiometrical excess of isocyanate groups. The particulate polymer is excellent in solvent resistance and has a completely spherical shape without wrinkle on the particle surface. The particulate polymer has a good toughness and mechanical properties. Further, the particulate polymer has no reactive isocyanate group in the polymer molecule.

8 Claims, No Drawings

ISOCYANURATE RING-CONTAINING CROSSLINKED POLYURETHANE POLYUREA PARTICULATE POLYMER AND PROCESS FOR PRODUCING THE SAME

FIELD OF THE INVENTION

The present invention relates to crosslinked polyurethane polyurea spherical particles having an average particle diameter of 0.1 to 500 μm, wherein polymer molecules contain an isocyanurate ring in an amount of 10 to 30% by weight, and a process for producing the isocyanurate ring-containing crosslinked polyurethane polyurea spherical particles.

Specifically, the present invention relates to crosslinked polyurethane polyurea spherical particles which have been obtained by a particle-forming process where three essential ingredients, i.e., an isocyanurate ring-containing polyisocyanate compound, a polyhydroxy compound, and a polyamine compound, are used and the polyisocyanate compound undergoes a polyurethane-forming reaction with the polyhydroxy compound and also undergoes a polyurea-forming reaction with the polyamine compound, and which have extremely good elasticity, and the polymer particle-forming process.

BACKGROUND OF THE INVENTION

The so-called interfacial polymerization method in which a hydrophobic substance is dispersed in an aqueous medium and an organic high-molecular substance (polymer) is allowed to grow at the interfaces between the dispersed droplets and the aqueous medium thereby to form minute particles is already well known.

In most of such techniques, an isocyanate prepolymer containing an isocyanate end group is dispersed in water and a polyamine or the like is added to the resulting dispersion, thereby to form stable polyurethane polyurea particles.

A feature of such interfacial polymerization reactions resides in that one of the particle wall-forming ingredients is fed only from the outside of the droplets. However, this feature has been a defect of interfacial polymerization reactions of the above kind.

Illustratively stated, according to the conventional technique, particle walls are formed by a polyurea-forming reaction between an amine and an isocyanate and once particle wall formation has been accomplished by this polyurea-forming reaction, the isocyanate groups remaining inside the particle walls are insulated by the walls from amino groups present in the water and a further reaction is not able to readily proceed. For this reason, as the particle walls grow further, migration of the amine from the water into the particles becomes significantly slow and, as a result, the reaction apparently comes to equilibrium, with unreacted isocyanate groups remaining undesirably within the particles.

The conventional interfacial polymerization technique, therefore, is defective in that the reproducibility of basic particle properties is poor and there also is a problem that reactive isocyanate groups undesirably remain or accumulate in the particles.

As an expedient for improving the shape of polyurethane polyurea particles, there is a method of conducting interfacial polymerization reaction in which a dispersant selected from various kinds is used when an isocyanate prepolymer having an isocyanate end group is dispersed in water, thereby to obtain spherical polyurethane polyurea particles. However, this method is defective in that it is necessary to use a dispersant in a large amount in order to obtain truly spherical particles and the large dispersant amount not only results in impaired surface properties of the resulting polyurethane polyurea particles due to the dispersant remaining on the particle surface, but also poses production problems such as the treatment of wastewater containing the dispersant.

Although polyurethane polyurea particles generally have good mechanical properties, chemical resistance, and other properties and are hence being utilized in various fields, they have a defect that, according to the shape of the particles, they cannot fully exhibit their intrinsic properties. Therefore, the production of polyurethane polyurea particles having a spherical shape like a truly spherical shape and no reactive isocyanate group are desired.

SUMMARY OF THE INVENTION

The present inventors have discovered the processes for producing polyurethane polyurea particles having excellent characteristics as disclosed in JP-A-2-240123 and JP-A-3-2266 (the term "JP-A" as used herein means an "unexamined published Japanese patent application").

Further, in view of the above-described various defects of the conventional techniques, the present inventors have made intensive studies in order to obtain crosslinked polyurethane polyurea particles of so-called spherical shape which are not mere polyurethane polyurea particles in which the polymer molecules are uncrosslinked, but polyurethane polyurea particles in which the polymer molecules have a three-dimensional crosslinked structure and which are able to fully exhibit their intrinsic properties. As a result, the present inventors have succeeded in obtaining the desired crosslinked polyurethane polyurea spherical particles. The present invention has thus been completed.

Accordingly, an object of the present invention is to provide crosslinked polyurethane polyurea spherical particles in which the wall and core of each particle have been sufficiently formed and which have exceedingly good elasticity.

The present invention provides crosslinked polyurethane polyurea spherical particles produced by using an isocyanate ring-containing polyisocyanate compound.

That is, in order to accomplish the above and other objects, the present invention provides a crosslinked polyurethane polyurea spherically particulate polymer obtained by the interfacial polymerization reaction of a polyamine and an organic phase comprising a mixture of an isocyanurate ring-containing polyisocyanate compound and a polyhydroxy compound and capable of forming a three-dimensional crosslinked structure through a reaction between the two compounds and by a polyurethane-forming reaction within particles, the amount of isocyanate groups in the polyisocyanate compound being stoichiometrically larger than that of hydroxyl groups in the polyhydroxy compound, and the amount of the polyamine being stoichiometrically equivalent to or smaller than the amount of the isocyanate groups.

There is, according to the present invention, provided a crosslinked polyurethane polyurea spherically particulate polymer having an average particle diameter of 0.1 to 500 μm wherein the polymer molecule contains an isocyanurate ring in an amount of 10 to 30% by weight. The particulate polymer of the present invention preferably has no reactive isocyanate group in the molecule.

Further, there is also provided a process for producing the crosslinked polyurethane polyurea spherically particulate polymer comprising the steps of: reacting an isocyanurate ring-containing polyisocyanate compound with a polyhydroxy compound to form an organic phase capable of forming a three-dimensional crosslinked structure due to the reaction, wherein the amount of isocyanate groups in the polyisocyanate compound is stoichiometrically larger than that of hydroxyl groups in the polyhydroxy compound; finely dispersing the organic phase into water; and adding a polyamine to the dispersion to make interfacial polymerization between the organic phase and the polyamine and a polyurethane-forming reaction within particles, wherein the amount of the polyamine is stoichiometrically equivalent to or smaller than the amount of the isocyanate groups.

DETAILED DESCRIPTION OF THE INVENTION

The process may further comprise the step of adding a urethane catalyst to the organic phase prior to the step of finely dispersing the organic phase into water, or the step of adding a urethane catalyst to the dispersion prior to the step of adding a polyamine to the dispersion and after the step of finely dispersing the organic phase into water.

Examples of the isocyanurate ring-containing polyisocyanate compounds used in the process of the present invention include those having a number-average molecular weight of from 200 to 10,000 and derived from an aromatic diisocyanate, an aliphatic diisocyanate or an alicyclic diisocyanate. The polyhydroxy compounds used in the present invention are those having a number-average molecular weight of from 200 to 10,000.

In producing the particulate polymer of the present invention, it is preferred that the isocyanurate ring-containing polyisocyanate compound, the polyhydroxy compound and the polyamine are used in such proportions that the ratio of the isocyanate group equivalent of the polyisocyanate compound to the hydroxyl group equivalent of the polyhydroxy compound is in the range of 1:0.1 to 1:0.9 and the ratio of the isocyanate group equivalent of the polyisocyanate compound to the polyamine equivalent is in the range of 1:0.2 to 1:1.0.

In the present invention, it is essential to use the isocyanurate-ring containing polyisocyanate compound in order to obtain a crosslinked polyurethane polyurea spherically particulate polymer having, particularly, extremely good elasticity, in which the wall and core of the polymer particle are sufficiently formed.

Although the reason why the isocyanurate ring-containing polyisocyanate compound has excellent effects for the production of the crosslinked polyurethane polyurea spherically particulate polymer has not completely clear, it is assumed that since the reactivity of the functional groups of the isocyanurate ring-containing polyisocyanate comprising a trimer of diisocyanates having the same chemical characteristics is substantially equivalent, the isocyanurate ring-containing polyisocyanate shows homogeneous reactivity as compared with the other polyurethane polyurea particulate polymer produced by using other kinds of polyisocyanates in a three-dimensional crosslinked structure-forming reaction with a polyhydroxy compound. Therefore, when the isocyanurate ring-containing polyisocyanate is used in the reactive organic phase for producing the polyurethane polyurea particulate polymer of the present invention, the organic phase has homogeneous state and is capable of easily forming a three-dimensional crosslinked structure.

Further, the isocyanurate ring-containing polyisocyanate has excellent dispersibility and this characteristic of the isocyanurate ring-containing polyisocyanate provides an important effect for the formation of the three-dimensional crosslinked structure which is important for obtaining the isocyanurate ring-containing crosslinked polyurethane polyurea spherically particulate polymer of the present invention.

According to the process for producing the isocyanurate ring-containing crosslinked polyurethane polyurea spherically particulate polymer of the present invention, the reaction within particles sufficiently progresses. Therefore, the thus produced polymer has no reactive isocyanate group in the polymer molecule.

The isocyanurate ring-containing crosslinked polyurethane polyurea particulate polymer of the present invention has a spherical shape close to a truly spherical shape. The polymer particle has a smooth surface without wrinkle. Further, it is confirmed by infrared absorption spectrum using KBr disk (tablet) method that the crosslinked polyurethane polyurea particulate polymer of the present invention has no isocyanate group.

The polyisocyanate used in the present invention may comprise two or more kinds of polyisocyanates such as a combination of the isocyanurate ring-containing polyisocyanate and other non-isocyanurate ring polyisocyanate(s) as long as the crosslinked polyurethane polyurea particulate polymer molecule to be produced contains an isocyanurate ring in an amount of 10 to 30% by weight. In order to obtain the crosslinked polyurethane polyurea particulate polymer of high quality, it is preferred to use the isocyanurate ring-containing polyisocyanate alone.

As the isocyanurate ring-containing polyisocyanate compound, use may be made of an isocyanurate ring-containing polyisocyanate compound derived from an aromatic diisocyanate in the case where weatherability or similar performance is not particularly required of the crosslinked polyurethane polyurea particulate polymer to be produced. Representative examples of the diisocyanate include such monomeric diisocyanates as tolylene diisocyanate, diphenylmethane 4,4'-diisocyanate, xylylene diisocyanate, naphthalene 1,5-diisocyanate, p-phenylene diisocyanate, dibenzyl diisocyanate, diphenyl ether diisocyanate, and m- or p-tetramethylxylene diisocyanate. These diisocyanates may be used alone or in combination of two or more thereof.

In the case where the crosslinked polyurethane polyurea particulate polymer to be produced is required to have weatherability or the like, use of an isocyanurate ring-containing polyisocyanate compound derived from an aliphatic and/or alicyclic diisocyanate is desirable. Representative examples of the diisocyanate include such monomeric diisocyanates as hydrogenated tolylene diisocyanate, hydrogenated diphenylmethane 4,4'-diisocyanate, 1,4-tetramethylene diisocyanate, 1,6-hexamethylene diisocyanate, hydrogenated xylylene diisocyanate, cyclohexyl 1,4-diisocyanate, and isophorone diisocyanate. These may be used alone or in combination of two or more thereof.

The isocyanurate ring-containing polyisocyanate compound to be used for producing the crosslinked polyurethane polyurea particulate polymer of the present invention may alternatively be an isocyanate group-terminated, urethane-modified, isocyanurate ring-containing polyisocyanate obtained by the polyurethane-forming reaction of one or more of the above-described various isocyanurate ring-containing polyisocyanate compounds with one or more of various polyhydroxy compounds such as polyhydric alcohols, polyols, polycarbonate polyols, polybutadiene polyols, hydroxyl group-containing fluorine compounds, and polypentadiene polyols. Such polyisocyanates may be used alone or in combination of two or more thereof.

The number-average molecular weight of the isocyanurate ring-containing polyisocyanate compound used for producing the crosslinked polyurethane polyurea spherically particulate polymer (hereinafter, often referred to as "polymer particles") is in the range of generally from 200 to 10,000, preferably from 300 to 7,000, more preferably from 500 to 5,000, in order to enable the polymer particles to have especially good toughness.

The polyhydroxy compound used for producing the polymer particles of the present invention is an essential ingredient constituting the organic phase along with the above-described isocyanurate ring-containing polyisocyanate compound. Use of this polyhydroxy compound is crucial in making up for insufficient intraparticulate crosslinking resulting from the formation of polymer particle walls and in imparting further improved mechanical strength to the polymer particles. As this polyhydroxy compound, any of known polyhydroxy compounds may be used.

Representative examples of the polyhydroxy compound include the following compounds grouped under (a) to (g):

(a) polyhydric alcohols such as ethylene glycol, propylene glycol, 1,3-propanediol, 1,4-butanediol, 1,3-butanediol, 1,5-pentanediol, neopentyl glycol, 1,6-hexanediol, 1,4-bis(hydroxymethyl)cyclohexane, bisphenol A, hydrogenated bisphenol A, hydroxypivalyl hydroxypivalate, trimethylolethane, trimethylolpropane, 2,2,4-trimethyl-1,3-pentanediol, glycerin, and hexanetriol;

(b) various polyether glycols such as poly(oxyethylene) glycol, poly(oxypropylene) glycol, poly(oxyethylene)poly(oxytetramethylene) glycol, poly(oxypropylene)poly(oxytetramethylene) glycol, and poly(oxyethylene)poly(oxypropylene)poly(oxytetramethylene) glycol;

(c) modified polyether polyols obtained by the ring-opening polymerization of any of the above-enumerated various polyhydric alcohols with any of various (cyclic) ether bond-containing compounds such as ethylene oxide, propylene oxide, tetrahydrofuran, ethyl glycidyl ether, propyl glycidyl ether, butyl glycidyl ether, phenyl glycidyl ether, and allyl glycidyl ether;

(d) polyester polyols obtained by the copolycondensation of one or more of the above-enumerated various polyhydric alcohols with a polycarboxylic acid such as, for example, succinic acid, adipic acid, sebacic acid, azelaic acid, phthalic acid, tetrahydrophthalic acid, hexahydrophthalic acid, maleic acid, fumaric acid, citraconic acid, itaconic acid, glutaconic acid, 1,2,5-hexanetricarboxylic acid, 1,4-cyclohexanedicarboxylic acid, 1,2,4-benzenetricarboxylic acid, 1,2,5-benzenetricarboxylic acid, 1,2,4-cyclohexanetricarboxylic acid, or 2,5,7-naphthalenetricarboxylic acid;

(e) lactone-derived polyester polyols obtained by the polycondensation reaction of one or more of the above-enumerated polyhydric alcohols with any of various lactones such as $\epsilon$-caprolactone, $\delta$-valerolactone, and 3-methyl-$\delta$-valerolactone, and lactone-modified polyester polyols obtained by the polycondensation reaction of any of the above-enumerated various polyhydric alcohols, any of the above-enumerated various polycarboxylic acids, and any of various lactones such as those enumerated above;

(f) epoxy-modified polyester polyols obtained by synthesizing polyester polyols in the presence of one or more of various epoxy compounds such as bisphenol A-type epoxy compounds, hydrogenated bisphenol A-type epoxy compounds, glycidyl ethers of mono- and/or polyhydric alcohols, and glycidyl esters of mono- and/or polybasic acids; and (g) other polyhydroxy compounds such as polyester-polyamide polyols, polycarbonate polyols, polybutadiene polyols, polypentadiene polyols, castor oil, castor oil derivatives, hydrogenated castor oil, hydrogenated castor oil derivatives, hydroxyl group-containing acrylic copolymers, hydroxyl group-containing fluorine compounds, and hydroxyl group-containing silicone resins.

These polyhydroxy compounds shown under (a) to (g) may, of course, be used alone or in combination of two or more thereof. The number-average molecular weights of the polyhydroxy compounds are in the range of generally from 200 to 10,000, preferably from 300 to 7,000, more preferably from 500 to 5,000, from the standpoint of attaining sufficient crosslinking within the polymer particles.

In order to obtain tough polymer particles, use of a polyester polyol, especially, a lactone-derived polyester polyol obtained by polycondensation reaction with a lactone such as $\epsilon$-caprolactone, $\delta$-valerolactone, or 3-methyl-$\delta$-valerolactone, as the polyhydric compound is desirable.

In producing the polymer particles of the present invention, it is crucially important that the isocyanurate ring-containing polyisocyanate compound and the polyhydroxy compound be mixed with each other in such proportions that the ratio of the isocyanate group equivalent of the polyisocyanate compound to the hydroxyl group equivalent of the polyhydroxy compound is in the range of generally from 1:0.1 to 1:0.9, preferably from 1:0.1 to 1:0.8, more preferably from 1:0.2 to 1:0.7. It is also crucially important that the mixture of the two ingredients have a composition which enables the mixture itself to crosslink three-dimensionally.

In other words, in order to convert a mixture of the two ingredients into a polyurethane completely, it is necessary that the mixture should have a composition which enables the mixture to become a gel that is never caused to flow even by heating or dilution with a true solvent therefor. Further, it is desired to add a catalyst described later to the reaction system and fully mix with the reactant.

In order to allow the interfacial polymerization reaction to proceed smoothly, isocyanate groups should be present in excess, i.e., the isocyanate group amount relative to the hydroxyl group amount should be in the above-specified range, and such an isocyanate group amount is necessary for rapid formation of particle walls.

Although each whole particle of the crosslinked polyurethane polyurea particulate polymer of the present invention has excellent toughness and solvent resistance because the inner part of the polymer particle is constituted by a crosslinked polymer, it is necessary that the isocyanurate ring content in the inner part of each particle be in the range of from 10 to 30% by weight for the purpose of imparting the desired particle properties to the polymer particles of the present invention, especially, enabling the truly spherical, crosslinked polyurethane polyurea spherically particulate polymer to exhibit excellent mechanical properties.

If the isocyanurate ring content is below 10%, the polymer particles necessarily have impaired mechanical properties. On the other hand, if the isocyanurate ring content is as high as above 30%, the amount of the polyhydroxy compound as a constituent of the particles decreases necessarily and the urethane bond content in the inner part of each particle becomes low.

In order to enable the intraparticulate polyurethane-forming reaction to proceed three-dimensionally, use of an isocyanurate ring-containing polyisocyanate compound and/or a polyhydroxy compound each of which has a functionality of 3 or more is necessary. By this, satisfactory intraparticulate three-dimensional crosslinking can be attained.

Since part of the isocyanate groups in the isocyanurate ring-containing polyisocyanate compound present in the organic phase are consumed with the progress of the interfacial polymerization reaction with a polyamine, which will be described later, the ratio of the isocyanate group equivalent to the hydroxyl group equivalent within the particles comes close to 1 and the intraparticulate crosslink density increases more and more with the progress of the polyurethane-forming reaction. As a result, the crosslinked polyurethane polyurea particulate polymer thus produced is able to have further improved toughness, solvent resistance, and other properties. In addition, since the specific polyisocyanate compound, i.e., the isocyanurate ring-containing polyisocyanate, is used according to the present invention, crosslinked polyurethane polyurea particulate polymer in which each polymer particle is spherical can be obtained.

The above-described hydrophobic organic phase, i.e., a mixture of the isocyanurate ring-containing polyisocyanate compound and the polyhydric compound, is finely dispersed generally in water, and a polyamine is added to the dispersion in an amount of from 0.2 to 1.0 equivalent, preferably from 0.3 to 1.0 equivalent, more preferably from 0.4 to 0.9 equivalent, per equivalent of the excess isocyanate groups contained in the organic phase, whereby a polyurea-forming reaction proceeds at the interfaces between the dispersed droplets and the aqueous medium and a polyurethane-forming reaction also takes place within particles. Through the two kinds of reactions crosslinked polyurethane polyurea spherically particulate polymer having extremely high toughness is obtained.

As the polyamine for use in producing the crosslinked polyurethane polyurea particulate polymer of the present invention, a customarily employed known diamine, polyamine, or a mixture thereof may advantageously be used. Representative examples thereof include 1,2-ethylenediamine, bis(3-aminopropyl)amine, hydrazine, hydrazine-2-ethanol, bis(2-methylaminoethyl)-methylamine, 1,4-diaminocyclohexane, 3-amino-1-methylaminopropane, N-hydroxyethylethylenediamine, N-methyl-bis(3-aminopropyl)amine, tetraethylenediamine, hexamethylenediamine, bis(N,N'-aminoethyl)-1,2-ethylenediamine, 1-aminoethyl-1,2-ethylenediamine, diethylenetriamine, tetraethylenepentamine, pentaethylenehexamine, phenylenediamine, toluylenediamine, 2,4,6-triaminotoluene trihydrochloride, 1,3,6-triaminonaphthalene, isophoronediamine, xylylenediamine, hydrogenated xylylenediamine, 4,4'-diaminodiphenylmethane, and hydrogenated 4,4'-diaminodiphenylmethane, and further include various derivatives of the above-enumerated monomeric polyamines.

If required and necessary, the hydrophobic organic phase to be dispersed in water in producing the crosslinked polyurethane polyurea particulate polymer of the present invention may be diluted with an organic solvent which is not reactive to the organic phase and water and is hydrophobic, thereby to lower the viscosity of the organic phase and improve the dispersibility thereof into an aqueous phase.

In this case, the proper amount of such an organic solvent is 50% by weight or less, preferably 30% by weight or less, based on the total amount of the diluted organic phase.

Exemplary organic solvents suited for dilution use include aromatic or aliphatic hydrocarbons, esters, ethers, and ketones. Preferred of these are benzene, toluene, xylene, cyclohexane, methylcyclohexane, diphenyl ether, mineral spirit, and the like.

The organic solvent used may, if needed, be removed by evaporation during or after the particle formation, by means of heating, vacuum, or other treatment.

It is preferable that one or more protective colloids selected from various kinds be added to the aqueous phase into which the organic phase is to be dispersed, in an amount in the range of from 0.1 to 5% by weight in order to obtain a dispersion system having further improved stability. Examples of the protective colloids include poly(vinyl alcohol), hydroxyalkyl celluloses, carboxyalkyl celluloses, gum arabic, polyacrylates, polyacrylamide, polyvinylpyrrolidone, and ethylene-maleic anhydride copolymers.

In the production of conventionally known polyurethane polyurea particulate polymer, the protective colloid is used in an amount in the range of from 0.1 to 15% by weight, generally about 10%. Since the crosslinked polyurethane polyurea particulate polymer of the present invention has excellent dispersibility, the amount of the protective colloid to be used can be reduced.

In order to obtain a dispersion system having furthermore improved stability, the aqueous phase may, of course, further contain a surfactant selected from customarily employed, various known surfactants of the nonionic, anionic, and cationic types, in an amount of from 0.1 to 10% by weight.

It should be noted that in practicing the above-described polymer particle-forming process, which is characterized in that a polyurethane-forming reaction is purposely conducted within particles, there is a tendency that, as is well known, the polyurethane-forming reaction between hydroxyl groups and isocyanate groups proceeds at a lower rate than the polyurea-forming reaction of isocyanate groups with amino groups particularly when the isocyanate groups are ones bonded to an aliphatic or alicyclic hydrocarbon moiety.

Despite the low reaction rate, the polyurethane-forming reaction within particles can be allowed to proceed to a sufficient degree, as required for producing the polymer particles of the present invention, by raising the reaction temperature and extending the reaction time because, as is well known, the reactivity of an isocyanate group with water is extremely low as compared with the reactivity thereof with a hydroxyl group and because penetration of water into particles being produced is little due to the insulating effect of particle walls formed by the addition of a polyamine. However, it is desirable that one or more organometallic catalyst selected from various kinds be added to the hydrophobic organic phase in an amount in the range of generally from 5 to 10,000 ppm, preferably from 10 to 5,000 ppm, of the organic phase for the purpose of very effectively accelerating the intraparticulate reaction of isocyanate groups with hydroxyl groups. Examples of such organometallic catalysts include cobalt naphthenate, zinc naphthenate, stannous chloride, stannic chloride, tetra-n-butyltin, tri-n-butyltin acetate, n-butyltin trichloride, trimethyltin hydroxide, dimethyltin dichloride, dibutyltin acetate, dibutyltin dilaurate, tin octenoate, and potassium oleate. By the addition of such an organometallic catalyst, tough crosslinked polymer particles can be formed within an extremely short time period.

The above-described catalyst is added to the organic phase prior to the step of finely dispersing the organic phase into water, or it is added prior to the step of adding a polyamine to the dispersion and after the step of finely dispersing the organic phase into the water. Preferably the catalyst is added to the organic phase prior to the step of finely dispersing the organic phase into water, since the catalyst is homogeneously dispersed into the reactant without the influence of water.

Addition of the catalyst after polyamine addition is not preferred in that the catalyst added is less apt to enter the inner parts of organic phase droplets because particle walls have already begun to be formed, leading to a tendency that the intraparticulate polyurethane-forming reaction is not sufficiently accelerated.

As described above in detail, crosslinked polyurethane polyurea spherically particulate polymer can be obtained by the process of the present invention. The particle diameters of the crosslinked polyurethane polyurea particulate polymer can be freely designed and regulated by suitably selecting various conditions including the ingredients constituting the organic phase, the kind and amount of the protective colloid and/or surfactant used in the organic phase-dispersing step, stirring speed for the dispersing step, and reaction temperature.

The crosslinked polyurethane polyurea particulate polymer of the present invention generally has an average particle diameter in the range of about from 0.1 to 500 $\mu$m. Although preferred average particle diameters vary according to applications of the polymer particles, the especially preferred range of the average particle diameter thereof is from 1 to 300 $\mu$m because such polymer particles show excellent performances including mechanical properties.

Into the particle cores of the crosslinked polyurethane polyurea particulate polymer according to the present invention, various substances can be incorporated.

Incorporation of a substance into the particle cores is attained by using a hydrophobic organic phase to which the substance has been added. Such substances that can be incorporated in the particle cores are not particularly limited in kind, and a wide variety of substances can be incorporated.

Since the crosslinked polyurethane polyurea particulate polymer of the present invention has no reactive isocyanate group, the substances incorporated into the particle cores are not subjected to chemical change. Therefore, in the present invention, a more wide variety of substances than those conventionally used can be incorporated in the particle cores.

Representative examples of such substances include various drugs or medicines such as herbicides, germicides, and insecticides, perfumes, colorants, color developers, enzymes, detergents, catalysts, rust-preventative agents, adhesives, other chemically synthesized products, food additives, and the like.

Further, a plasticizer inactive to isocyanate group, a paraffin, an animal or vegetable oil, a silicone oil, or a synthetic resin selected from various kinds including xylene resins and ketone resins may also be suitably incorporated in the particle cores, according to need.

A process for preparing the crosslinked polyurethane polyurea particulate polymer of the present invention may be conducted roughly as follows.

(a) First, the organic phase is dispersed in an aqueous phase. This step is preferably conducted at around room temperature, specifically between 10° and 35° C., from the standpoint of stabilizing the resulting dispersion system.

The dispersion of the organic phase into an aqueous phase can be easily carried out by a dispersing means such as a homogenizer, homodisper, or propeller-type general-purpose stirrer or by other conventional dispersing means or technique.

(b) After completion of the above dispersing step, the dispersion system preferably is stirred mildly with a propeller-type stirrer. This stirring is advantageous in most cases in order to keep each droplet spherical, particularly, truly spherical.

(c) A polyamine is then added to the resulting dispersion at a temperature of from 10° to 35° C. It is preferred that the polyamine be added after being diluted with water to a concentration of 5 to 70% by weight in terms of active ingredient amount.

(d) The resultant dispersion is kept at that temperature for several tens of minutes to several hours. Thereafter, the reaction temperature is raised to 40° to 95° C., preferably 50° to 90° C., and the dispersion is kept at this temperature for one to several hours, whereby crosslinked polyurethane polyurea particles, especially, spherical and tough, crosslinked polyurethane polyurea particles, having particle diameters of from 0.1 to 500 $\mu$m can be obtained.

(e) The thus-obtained polymer particles are used according to their applications. It is also possible to use the polymer particles as a fine powder after drying by the spray drying, centrifugal separation drying, filtration drying, or fluidized bed drying method or the like.

As described above, the crosslinked polyurethane polyurea particulate polymers of the present invention, which can be thus obtained, are truly spherical polymer particles in which reactions have been sufficiently completed to such a degree that even a trace of reactive isocyanate groups is unable to be observed within the particles.

Further, since the particle cores of the crosslinked polyurethane polyurea particulate polymer of the present invention have been formed from the organic phase employing, as one component thereof, an isocyanurate ring-containing polyisocyanate compound, the polymer particles have excellent solvent resistance, extreme toughness and excellent mechanical properties. Furthermore, since reactive isocyanate groups do not remain in the particle cores forming the crosslinked polyurethane polyurea particulate polymer of the present invention, chemical change of the particle cores due to the remaining reactive isocyanate groups does not occur.

The present invention will be explained in more detail with reference to the following Examples, and Comparative Examples, but the invention is not construed as being limited thereto. In these examples, all parts and percents are by weight unless otherwise indicated.

The following compounds were used as raw materials in the Examples and Comparative Example.

(A) Isocyanurate Ring-Containing Polyisocyanate Compounds:
  (1) "Sumidule IL" [isocyanurate ring-containing polyisocyanate obtained using tolylene diisocyanate; manufactured by Sumitomo Bayer Urethane Co., Ltd., Japan; isocyanate group content based on solid content, 15.7%]; hereinafter referred to as PI-1.
  (2) "Burnock DN-901S" [isocyanurate ring-containing polyisocyanate obtained using hexamethylene diisocyanate; manufactured by Dainippon Ink and Chemicals, Inc., Japan; isocyanate group content based on solid content, 23.5%]; hereinafter referred to as PI-2.

(B) Polyhydroxy Compounds:
  (1) Polycaprolactone polyester diol obtained by polycondensation reaction of neopentyl glycol with ε-caprolactone and having a hydroxyl value of 187; hereinafter referred to as PO-1.
  (2) Polycaprolactone polyester triol obtained by polycondensation reaction of trimethylolpropane with ε-caprolactone and having a hydroxyl value of 168.5; hereinafter referred to as PO-2.
  (3) Polycaprolactone polyester triol obtained by polycondensation reaction of trimethylolpropane with ε-caprolactone and having a hydroxyl value of 112.2; hereinafter referred to as PO-3.

(C) Polyamine Compounds:
  (1) Ethylenediamine; hereinafter referred to as EDA.
  (2) 1,6-Hexamethylenediamine; hereinafter referred to as HMDA.

The thus produced polymer particles were observed to examine the shape of particles by electron microscope (×3500). Further, mechanical strength of the polymer particles was examined by using a micro compressive tester for powder, PCT-200 (manufactured by Shimadzu Corporation). That is, the mechanical strength was examined by putting a powder particle on a supporting plate, subjecting the particle to a load vertically from above the particle, and measuring the loading value when the particle was broken. The average loading value of each three particle for each sample was defined as the mechanical strength.

EXAMPLE 1

In a 1,000-ml flask, an aqueous phase was prepared by dissolving 8 parts of "PVA-205" [partially saponified poly(vinyl alcohol) manufactured by Kuraray Co., Ltd., Japan] in 392 parts of water.

In another vessel, 170.6 parts of PI-1 was mixed with 13.0 parts of PO-1 to give an organic phase.

While the aqueous phase in the flask was kept being stirred at 7,000 to 7,500 rpm with a homomixer at room temperature, the above-prepared organic phase was added to the aqueous phase. Thereafter, the stirring was further continued for a minute, thereby obtaining a dispersion.

This dispersion was then transferred to a separate flask. While the transferred dispersion was kept being stirred at 200 rpm with a paddle agitator, 0.01 part of dibutyltin dilaurate (DBTDL) was added thereto and, 2 minutes later, 6.34 parts of 50% aqueous solution of EDA was further added thereto.

The resulting mixture was kept at room temperature for 2 hours. Thereafter, this mixture was heated to 50° C., kept at this temperature for an hour, subsequently heated to 80° C., and then kept at this temperature for 2 hours, whereby reactions were allowed to proceed. Thus, a dispersion of desired crosslinked polyurethane polyurea particles was obtained.

The thus-produced polymer particles had an average particle diameter of 15 μm. It was ascertained from examination of an electron photomicrograph that the polymer particles were completely spherical without wrinkle on the particle surface. Further, the polymer particles were ground to mold into a disk form and the infrared absorption spectrum of the polymer was obtained by KBr disk method. As a result, it was ascertained from the spectrum that no reactive isocyanate group remains in the polymer since no absorption was recognized in the band of 2000 to 2300 cm$^{-1}$ which is peculiar to an isocyanate group.

EXAMPLE 2

A dispersion of desired crosslinked polyurethane polyurea particles was obtained in the same manner as in Example 1 except that the kinds and amounts of the ingredients were changed as follows.

That is, an aqueous phase was prepared from 20 parts of "Fuji-Chemi HEC AL-15F" [hydroxyethyl cellulose manufactured by Fuji Chemical Co., Ltd., Japan] and 380 parts of water; an organic phase was prepared from 77.8 parts of PI-2 and 12.9 parts of PO-2; 0.01 part of DBTDL was used as a polyurethane formation catalyst; and 16.4 parts of 50% aqueous solution of HMDA was used as a polyamine. As a result, a dispersion of completely crosslinked polymer particles was obtained.

The thus-produced polymer particles had an average particle diameter of 20 μm. It was ascertained from examination of an electron photomicrograph that the polymer particles were completely spherical without wrinkle on the particle surface. Further, the polymer particles were ground to mold into a disk form and the infrared absorption spectrum of the polymer was obtained by KBr disk method. As a result, it was ascertained from the spectrum that no reactive isocyanate group remains in the polymer since no absorption was recognized in the band of 2000 to 2300 cm$^{-1}$ which is peculiar to an isocyanate group.

EXAMPLE 3

A dispersion of desired crosslinked polyurethane polyurea particles was obtained in the same manner as in Example 1 except that the kinds and amounts of the ingredients were changed as follows.

That is, an aqueous phase was prepared from 8 parts of "PVA-205" and 392 parts of water; an organic phase was prepared from 73.1 parts of PI-2 and 18.2 parts of PO-2; 0.01 part of DBTDL was used as a polyurethane formation catalyst; and 7.6 parts of 50% aqueous solution of HMDA was used as a polyamine. As a result, a dispersion of completely crosslinked polymer particles was obtained.

The thus-produced polymer particles had an average particle diameter of 25 $\mu$m. It was ascertained from examination of an electron photomicrograph that the polymer particles were completely spherical without wrinkle on the particle surface. Further, the polymer particles were ground to mold into a disk form and the infrared absorption spectrum of the polymer was obtained by KBr disk method. As a result, it was ascertained from the spectrum that no reactive isocyanate group remains in the polymer since no absorption was recognized in the band of 2000 to 2300 cm$^{-1}$ which is peculiar to an isocyanate group.

EXAMPLE 4

A dispersion of desired crosslinked polyurethane polyurea particles was obtained in the same manner as in Example 1 except that the kinds and amounts of the ingredients were changed as follows.

That is, an aqueous phase was prepared from 2 parts of "PVA-205" and 398 parts of water; and an organic phase was prepared from 80.0 parts of PI-2 and 20.0 parts of PO-3, wherein 0.01 part of DBTDL was used as a polyurethane formation catalyst and was added to the organic phase prior to aqueous dispersion.

As a polyamine, 6.5 parts of 50% aqueous solution of EDA was used. As a result, a dispersion of completely crosslinked polymer particles was obtained.

The thus-produced polymer particles had an average particle diameter of 18 $\mu$m. It was ascertained from examination of an electron photomicrograph that the polymer particles were completely spherical without wrinkle on the particle surface. Further, the polymer particles were ground to mold into a disk form and the infrared absorption spectrum of the polymer was obtained by KBr disk method. As a result, it was ascertained from the spectrum that no reactive isocyanate group remains in the polymer since no absorption was recognized in the band of 2000 to 2300 cm$^{-1}$ which is peculiar to an isocyanate group.

EXAMPLE 5

A dispersion of desired crosslinked polyurethane polyurea particles was obtained in the same manner as in Example 1 except that the kinds and amounts of ingredients were changed as follows.

That is, an aqueous phase was prepared from 8 parts of "PVA-205" and 392 parts of water; and an organic phase was prepared from 170.6 parts of PI-1 and 14.4 parts of PO-2, wherein 0.01 part of DBTDL was used as a polyurethane formation catalyst and was added to the organic phase prior to aqueous dispersion.

As a polyamine, 6.2 parts of 50% aqueous solution of EDA was used. As a result, a dispersion of completely crosslinked polymer particles was obtained.

The thus-produced polymer particles had an average particle diameter of 17 $\mu$m. It was ascertained from examination of an electron photomicrograph that the polymer particles were completely spherical without wrinkle on the particle surface. Further, the polymer particles were ground to mold into a disk form and the infrared absorption spectrum was obtained by KBr disk method. As a result, it was ascertained from the spectrum that no reactive isocyanate group remains in the polymer since no absorption was recognized in the band of 2000 to 2300 cm$^{-1}$ which is peculiar to an isocyanate group.

EXAMPLE 6

A dispersion of desired crosslinked polyurethane polyurea particles was obtained in the same manner as in Example 1 except that the kinds and amounts of the ingredients were changed as follows.

That is, an aqueous phase was prepared from 0.4 part of "PVA-205" and 399.6 parts of water; and an organic phase was prepared from 70.6 parts of PI-2 and 29.4 parts of PO-1, wherein 0.01 part of DBTDL was used as a polyurethane formation catalyst and was added to the organic phase prior to aqueous dispersion.

While the aqueous phase in the flask was kept being stirred at 3,500 to 4,000 rpm with a homomixer, the above-prepared organic phase was added to the aqueous phase, thereby obtaining a dispersion.

As a polyamine, 6.0 parts of 50% aqueous solution of HMDA was used. As a result, a dispersion of completely crosslinked polymer particles was obtained.

The thus-produced polymer particles had an average particle diameter of 92 $\mu$m. It was ascertained from examination of an electron photomicrograph that the polymer particles were completely spherical without wrinkle on the particle surface. Further, the polymer particles were ground to mold into a disk form and the infrared absorption spectrum of the polymer was obtained by KBr disk method. As a result, it was ascertained from the spectrum that no reactive isocyanate group remains in the polymer since no absorption was recognized in the band of 2000 to 2300 cm$^{-1}$ which is peculiar to an isocyanate group.

EXAMPLE 7

A dispersion of desired crosslinked polyurethane polyurea particles was obtained in the same manner as in Example 1 except that the kinds and amounts of the ingredients were changed as follows.

That is, an aqueous phase was prepared from 2 parts of "PVA-205" and 398 parts of water; and an organic phase was prepared from 90.0 parts of PI-2 and 10.0 parts of PO-1, wherein 0.01 part of DBTDL was used as a polyurethane formation catalyst and was added to the organic phase prior to aqueous dispersion.

As a polyamine, 6.0 parts of 50% aqueous solution of EDA was used. As a result, a dispersion of completely crosslinked polymer particles was obtained.

The thus-produced polymer particles had an average particle diameter of 16 $\mu$m. It was ascertained from examination of an electron photomicrograph that the polymer particles were completely spherical without wrinkle on the particle surface. Further, the polymer particles were ground to mold into a disk form and the infrared absorption spectrum of the polymer was obtained by KBr disk method. As a result, it was ascertained from the spectrum that no reactive isocyanate group remains in the polymer since no absorption was recognized in the band of 2000 to 2300 cm$^{-1}$ which is peculiar to an isocyanate group.

COMPARATIVE EXAMPLE 1

A dispersion of desired crosslinked polyurethane polyurea particles as a control was obtained in the same manner as in Example 1 except that "Burnock DN-950" [adduct-type polyisocyanate compound manufactured by Dainippon Ink and Chemicals, Inc.; isocyanate group content based on solid content, 16.7%; hereinafter referred to as PI-3] was used in place of the isocyanurate ring-containing polyisocyanate compound and that the kinds and amounts of the ingredients were changed as follows.

That is, an aqueous phase was prepared from 8 parts of "PVA-205" and 392 parts of water; an organic phase was prepared from 84.9 parts of PI-3 and 15.1 parts of PO-3; 0.01 part of DBTDL was used as a polyurethane formation catalyst; and 6.62 parts of 50% aqueous solution of EDA was used as a polyamine. As a result, a dispersion of crosslinked polymer particles was obtained.

The thus-produced polymer particles had an average particle diameter of 20 μm. Examination of an electron photomicrograph of the polymer particles revealed that the particles had wrinkled surfaces.

COMPARATIVE EXAMPLE 2

A dispersion of desired crosslinked polyurethane polyurea particles as a control was obtained in the same manner as in Example 1 except that the kinds and amounts of the ingredients were changed as follows.

That is, an aqueous phase was prepared from 8 parts of "PVA-205" and 392 parts of water; an organic phase was prepared from 26.8 parts of PI-2, 37.4 parts of PI-3 and 35.8 parts of PO-1; 0.01 part of DBTDL was used as a polyurethane formation catalyst; and 5.8 parts of 50% aqueous solution of EDA was used as a polyamine. As a result, a dispersion of crosslinked polymer particles was obtained.

The thus-produced polymer particles had an average particle diameter of 23 μm. Examination of an electron photomicrograph of the polymer particles revealed that the particles had wrinkled surfaces.

Each of the crosslinked polyurethane polyurea particle dispersions as obtained in Examples 1 to 7 and Comparative Examples 1 and 2 was converted into a powder by the spray drying method. The thus-obtained powders were compared with respect to the shape, average diameter, and mechanical strength of the particles. This comparison is summarized in Table 1. In Table 1, the "truly spherical" means a substantially complete spherical particle without the presence of wrinkle on the surface.

TABLE 1

| Example No. | Particle Shape | Average Particle Diameter (μm) | Mechanical Strength (kg/cm$^2$) |
|---|---|---|---|
| Ex. 1 | Truly Spherical | 15 | 45 |
| Ex. 2 | " | 20 | 43 |
| Ex. 3 | " | 25 | 52 |
| Ex. 4 | " | 18 | 58 |
| Ex. 5 | " | 17 | 56 |
| Ex. 6 | " | 92 | 48 |
| Ex. 7 | " | 16 | 58 |
| Comp. Ex. 1 | Wrinkled | 20 | 12 |
| Comp. Ex. 2 | Wrinkled | 23 | 25 |

As apparent from the results in Table 1, the crosslinked polyuethane polyurea particles of the present invention are completely spherical without the presence of wrinkle on the particle surface and have excellent mechanical strength.

While the invention has been described in detail and with reference to specific embodiments thereof, it will be apparent to one skilled in the art that various changes and modifications can be made therein without departing from the spirit and scope thereof.

What is claimed is:

1. A process for producing a crosslinked polyurethane polyurea spherically particulate polymer having an average particle diameter of 0.1 to 500 μm wherein the polymer molecule contains an isocyanurate ring in an amount of 10 to 30% by weight, comprising the steps of: reacting an isocyanurate ring-containing polyisocyanate compound with a polyhydroxy compound to form an organic phase capable of forming a three-dimensional crosslinked structure due to the reaction, wherein the amount of isocyanate groups in the polyisocyanate compound is stoichiometrically larger than that of hydroxyl groups in the polyhydroxy compound; finely dispersing the organic phase into water; and adding a polyamine to the dispersion to make interfacial polymerization between the organic phase and the polyamine and a polyurethane-forming reaction within particles, wherein the amount of the polyamine is stoichiometrically equivalent to or smaller than the stoichiometrical excess of isocyanate groups.

2. The process for producing a crosslinked polyurethane polyurea spherically particulate polymer of claim 1, wherein a urethane catalyst is added to the organic phase prior to the step of finely dispersing the organic phase into water.

3. The process for producing a crosslinked polyurethane polyurea spherically particulate polymer of claim 1, wherein a urethane catalyst is added to the dispersion prior to the step of adding a polyamine to the dispersion and after the step of finely dispersing the organic phase into water.

4. The process for producing a crosslinked polyurethane polyurea spherically particulate polymer of claim 1, wherein the isocyanurate ring-containing polyisocyanate compound is a compound derived from an aromatic diisocyanate, an aliphatic diisocyanate or an alicyclic diisocyanate, which has a number-average molecular weight of from 200 to 10,000.

5. The process for producing a crosslinked polyurethane polyurea spherically particulate polymer of claim 1, wherein the polyhydroxy compound has a number-average molecular weight of from 200 to 10,000.

6. The process for producing a crosslinked polyurethane polyurea spherically particulate polymer of claim 1, wherein the ratio of the isocyanate group equivalent of the polyisocyanate compound to the hydroxyl group equivalent of the polyhydroxy compound is in the range of 1:0.1 to 1:0.9.

7. The process for producing a crosslinked polyurethane polyurea spherically particulate polymer of claim 1, wherein the ratio of the isocyanate group equivalent of the polyisocyanate compound to the polyamine equivalent is in the range of 1:0.2 to 1:1.0.

8. The crosslinked polyurethane polyurea spherically particulate polymer having an average paraticle diameter of 0.1 to 500 μm wherein the polymer contains an isocyanurate ring in an amount of 10 to 30% by weight prepared by the process of claim 1.

* * * * *